No. 698,996. Patented Apr. 29, 1902.
J. A. McCLUNG.
CULTIVATOR.
(Application filed Feb. 7, 1902.)
(No Model.)
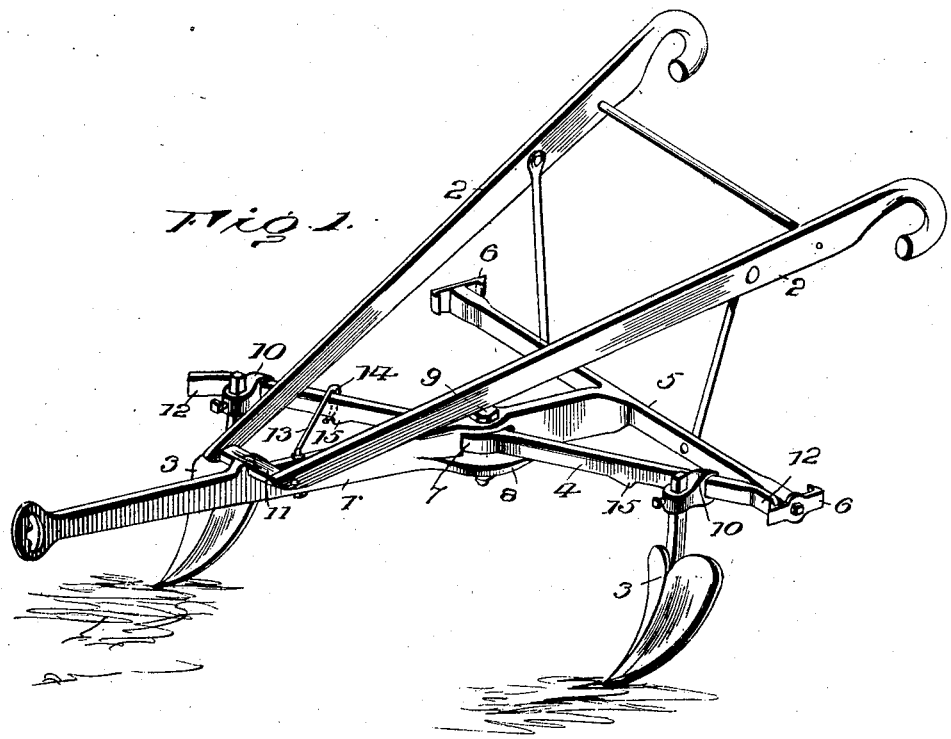
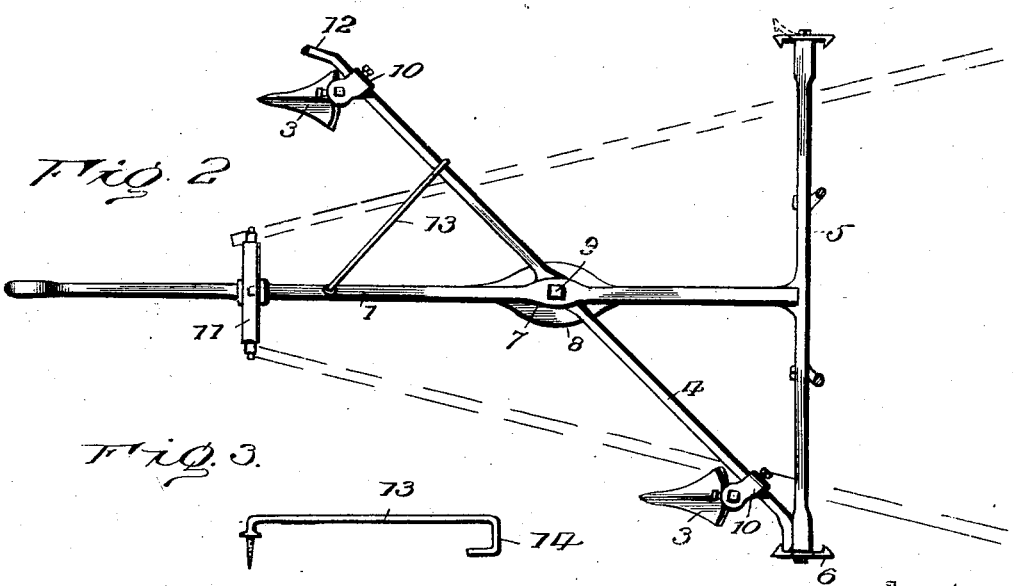
Witnesses
Inventor
James A. McClung
By
R.P.A.B. Lacey, Attorneys
THE NORRIS PETERS CO., PHOTO-LITHO., WASHINGTON, D. C.

UNITED STATES PATENT OFFICE.

JAMES A. McCLUNG, OF MOUNT LOOKOUT, WEST VIRGINIA.

CULTIVATOR.

SPECIFICATION forming part of Letters Patent No. 698,996, dated April 29, 1902.

Application filed February 7, 1902. Serial No. 93,036. (No model.)

*To all whom it may concern:*

Be it known that I, JAMES A. MCCLUNG, a citizen of the United States, residing at Mount Lookout, in the county of Nicholas and State of West Virginia, have invented certain new and useful Improvements in Cultivators; and I do hereby declare the following to be a full, clear, and exact description of the invention, such as will enable others skilled in the art to which it appertains to make and use the same.

This invention belongs to agricultural machinery of the type specially designed for tilling the soil, and aims to provide a cultivator which may be conveniently and advantageously used either on level or sloping land, the implement being constructed so as to be used on a hillside in traveling back and forth, the beam carrying the shovels being mounted to swing so as to reverse the position of the shovels prior to recrossing the ground when reaching the end of a row or furrow.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a cultivator embodying the invention. Fig. 2 is a top view thereof. Fig. 3 is a detail view of the brace for strengthening the swing-beam.

Corresponding and like parts are referred to in the following description and indicated in all the views of the drawings by the same reference characters.

The implement comprises the draft-beam 1, provided at its front end with a clevis of any construction for attachment of the draft thereto, handles 2, cross-bars 5 and 11, and a swing-beam 4, pivoted to the draft-beam 1 and provided with the shovels 3 for plowing or cultivating the soil. The cross-bar 5 is located at the rear end of the draft-beam 1 and is rigidly attached thereto, and the cross-bar 11 is applied to the draft-beam 1 at a point intermediate of its ends and is considerably shorter than the cross-bar 5. The handles 2 are attached at their lower ends to the extremities of the cross-bar 11 and are strengthened by braces which have connection with the cross-bar 5.

The draft-beam 1 has a portion near its rear end widened vertically and laterally, the vertical portion having a longitudinal slot 7 and the lateral portion forming a support 8 for the swing-beam 4, which is passed through the slot 7 and is mounted upon a bolt 9, extending across said slot and supported in the parts of the beam above and below said slot.

The swing-beam 4 has its end portions bent, as shown at 12, and adapted to be engaged by a catch applied to each end of the cross-bar 5, so as to hold the swing-beam in either of its extreme positions when turned to throw either the right-hand or the left-hand shovel forward. The catches 6 may be of any construction so long as they serve to engage with the swing-beam and hold it in the required position. As shown, the catches are double-ended and have pivotal connection with the extremities of the cross-bar 5 and are adapted to be turned so as to throw either end to the front. The shovels 3, which may be of any type, according to the nature of the work to be performed, are clipped to the swing-beam 4, the clips 10 being of suitable construction so as to admit of vertical and lateral adjustment of the shovels. The construction is such as to admit of either shovel occupying the foremost position whether the implement is traveling across the field either to the right or to the left. When plowing or cultivating a hillside, the swing-beam can be turned so as to admit of the upper shovel occupying either the foremost or rearmost position, according to the convenience and caprice of the farmer.

The brace 13 has pivotal connection with the draft-beam 1 at a point in advance of the bolt 9 and is adapted to engage with either end of the swing-beam 4 and strengthen the same and enable it to withstand severe strain. The swinging end of the brace 13 is formed with a hook 14, which is adapted to embrace the swing-beam and engage with a shoulder 15, so as to fix the position of the brace and prevent inward movement at its outer end. This construction provides a ready means for detaching the brace from the swing-beam preliminary to changing the position thereof to throw the foremost shovel to the rear when required.

Having thus described the invention, what is claimed as new is—

1. In combination, a draft-beam having a longitudinal slot and the portion at the lower side of the slot widened laterally, a swing-beam pivotally mounted in the said slot and provided at its ends with cultivator-shovels, and means for holding the swing-beam in the required position, substantially as set forth.

2. In combination, a draft-beam, a cross-bar, a swing-beam provided with cultivator-shovels, and catches for securing the swing-beam to either end of the aforesaid cross-bar, substantially as set forth.

3. In combination, a draft-beam, a cross-bar, a swing-beam provided with cultivator-shovels and having its outer end bent, and catches applied to the ends of the cross-bar to engage with the bent ends of the swing-beam to hold it in an adjusted position, substantially as set forth.

4. A cultivator comprising a draft-beam, front and rear cross-bars, handles supported by means of the cross-bars, a swing-beam pivoted to the draft-beam and provided with cultivator-shovels, and catches at the ends of the rear cross-bar to engage with either end of the swing-beam for holding it in the required position, substantially as specified.

In testimony whereof I affix my signature in presence of two witnesses.

JAMES A. McCLUNG. [L. S.]

Witnesses:
 O. H. EVANS,
 W. A. EVANS.